(12) United States Patent
Chawla et al.

(10) Patent No.: US 12,554,683 B1
(45) Date of Patent: Feb. 17, 2026

(54) DEDUPLICATION IN RETRIEVAL-ACCESS GENERATION INGESTION VERSIONING

(71) Applicant: Dell Products L.P., Round Rock, TX (US)

(72) Inventors: Gaurav Chawla, Austin, TX (US); Adam E. Brenner, Mission Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/946,762

(22) Filed: Nov. 13, 2024

(51) Int. Cl.
   G06F 16/174 (2019.01)
   G06F 16/14 (2019.01)

(52) U.S. Cl.
   CPC ........ G06F 16/1748 (2019.01); G06F 16/152 (2019.01)

(58) Field of Classification Search
   CPC .......................... G06F 16/1748; G06F 16/152
   See application file for complete search history.

(56) References Cited

U.S. PATENT DOCUMENTS

| | | | |
|---|---|---|---|
| 9,336,092 B1 | 5/2016 | Li | |
| 11,194,792 B2 * | 12/2021 | Lu | ............ G06F 16/2255 |
| 12,020,140 B1 | 6/2024 | Mondlock | |
| 12,079,570 B1 | 9/2024 | Mondlock | |
| 12,135,740 B1 | 11/2024 | Yu | |
| 12,164,664 B1 | 12/2024 | Dupont | |
| 12,204,565 B1 | 1/2025 | Yu | |
| 12,235,882 B1 | 2/2025 | Chawla | |
| 12,277,409 B1 | 4/2025 | Leeman-Munk | |
| 12,401,743 B1 | 8/2025 | Paliwal | |
| 2015/0234710 A1 * | 8/2015 | Berrington | .......... G06F 16/1752 707/664 |
| 2018/0246950 A1 | 8/2018 | Arye | |
| 2020/0334254 A1 | 10/2020 | Arye | |
| 2024/0046318 A1 * | 2/2024 | Muriqi | ............... G06Q 30/0273 |
| 2024/0111498 A1 | 4/2024 | Vaughn | |

(Continued)

OTHER PUBLICATIONS

Chawla, et al. "Updates and Deletes in Retrieval-Access Generation Ingestion Versioning" U.S. Appl. No. 18/946,770, filed Nov. 13, 2024, 52 pages.

(Continued)

Primary Examiner — Angelica Ruiz
(74) Attorney, Agent, or Firm — Amin, Turocy & Watson, LLP

(57) ABSTRACT

A system can store a checkpoint that comprises pairs and first hash values that correspond to the at least some respective first data, wherein respective pairs of the pairs comprise respective identifications of at least some respective first data stored in a storage system and respective second generation identifiers that correspond to the respective data. The system can query a search system to identify at least one first portion of the data that has at least one respective third generation identifier that is greater than the respective second generation identifiers, determine respective second hash values for respective second data of the at least one first portion of the data, identify at least one second portion of the data for which the respective second hash values do not match any of the first hash values, and ingest the at least one second portion of the data into the retrieval-augmented generation system.

20 Claims, 13 Drawing Sheets

(56) References Cited

U.S. PATENT DOCUMENTS

| | | | |
|---|---|---|---|
| 2024/0256592 A1* | 8/2024 | O'Neill | G06F 16/435 |
| 2024/0256678 A1* | 8/2024 | Thompson | G06F 21/577 |
| 2024/0311342 A1 | 9/2024 | Shankar | |
| 2024/0362208 A1* | 10/2024 | Naufel | G06F 16/243 |
| 2024/0380802 A1 | 11/2024 | Gill | |
| 2024/0386015 A1 | 11/2024 | Crabtree | |
| 2024/0394965 A1* | 11/2024 | Doggett | G06N 20/00 |
| 2024/0411528 A1* | 12/2024 | Ziolkowski | G06F 8/72 |
| 2024/0412720 A1* | 12/2024 | Vasylyev | G06F 16/90332 |
| 2024/0419830 A1* | 12/2024 | Park | G06F 21/6254 |
| 2025/0094400 A1 | 3/2025 | Mishra | |
| 2025/0117412 A1 | 4/2025 | Jalagam | |
| 2025/0190802 A1 | 6/2025 | Kar | |
| 2025/0209312 A1 | 6/2025 | Crabtree | |
| 2025/0245218 A1 | 7/2025 | Longoni | |
| 2025/0252359 A1 | 8/2025 | Pesala | |
| 2025/0265071 A1 | 8/2025 | Anantheswaran | |

OTHER PUBLICATIONS

Office Action mailed Sep. 9, 2025 for U.S. Appl. No. 18/946,770, 50 pages.

* cited by examiner

400

```
{
  "folder paths": [
    {
      "path": "/johndoe/data",
      "generation": 42,
      "chunks": [
        "9A6747FC6259AA374AB4E1BB03074B6EC672CF99",
        "4A0771A62988B5FF979A5C05C2FB91A7473EF08B",
        ... etc. ...
      ]
    },
    {
      "path": "/janedoe",
      "generation": 24,
      "chunks": [
        "10063260D51FF17BF2633BE07FC2C56475E1F01E",
        "FC64AA339779F803D4C458E734F8D05443A4B4E4"
      ]
    }
  ]
}
```

READING THE STATE FILE AND GETTING HASHES OF PAST RUNS 704

↓

GETTING THE NEW FILES THAT HAVE NOT BEEN PROCESSED FROM METADATA INDEX MANAGEMENT COMPONENT 706

↓

FOR EACH NEW FILE, DETERMINING A HASH AND COMPARING THAT HASH WITH PREVIOUSLY KNOWN HASHES 708

DEDUPLICATION IN RETRIEVAL-ACCESS GENERATION INGESTION VERSIONING

RELATED APPLICATIONS

The subject patent application is related by subject matter to, U.S. patent application Ser. No. 18/946,770, filed Nov. 13, 2024 and entitled "UPDATES AND DELETES IN RETRIEVAL-ACCESS GENERATION INGESTION VERSIONING," the entirety of which application is hereby incorporated by reference herein.

BACKGROUND

A retrieval-access generation (RAG) system can generally comprise a large language model (LLM) that operates on a specific information set (e.g., a set of documents) so that the LLM is configured to respond to queries based on that information set. A LLM can generally comprise a form of generative artificial intelligence (AI) that is configured to generative natural-language response outputs to natural-language query inputs.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can store a checkpoint that comprises pairs and first hash values, wherein respective pairs of the pairs comprise respective identifications of at least some respective first data stored in a storage system and respective second generation identifiers that correspond to the respective data, and wherein respective first hash values of the first hash values correspond to the at least some respective first data. The system can, based on executing a retrieval-augmented generation process comprising performance of an iteration of ingesting data from the storage system and to send the data to be ingested by a retrieval-augmented generation system, wherein the retrieval-augmented generation process is configured to ingest the data via a communications protocol that omits tracking of previously-ingested data, query a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data, determine respective second hash values for respective second data of the at least one first portion of the data, identify at least one second portion of the data for which the respective second hash values do not match any of the first hash values, and ingest the at least one second portion of the data into the retrieval-augmented generation system while refraining from ingesting at least one third portion of the data that has at least one respective fourth generation identifier that is less than or equal to the respective second generation identifiers in the checkpoint, and while refraining from ingesting at least one fourth portion of the data for which the respective second hash values match any of the first hash values. The system can service queries to the retrieval-augmented generation system based on the ingesting of the at least one second portion of the data.

An example method can comprise storing, by a system comprising at least one processor, a checkpoint that comprises pairs and first hash values, wherein respective pairs of the pairs comprise respective identifications of at least some respective first data stored in a storage system and respective second generation identifiers that correspond to the respective data, and wherein respective first hash values of the first hash values correspond to the at least some respective first data. The method can further comprise based on ingesting data from the storage system and to a retrieval-augmented generation system, querying, by the system, a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data. The method can further comprise determining, by the system, respective second hash values for respective second data of the at least one first portion of the data. The method can further comprise identifying, by the system, at least one second portion of the data for which the respective second hash values do not match any of the first hash values. The method can further comprise ingesting, by the system, the at least one second portion of the data into the retrieval-augmented generation system while refraining from ingesting at least one third portion of the data that has at least one respective fourth generation identifier that is less than or equal to the respective second generation identifiers in the checkpoint, and while refraining from ingesting at least one fourth portion of the data for which the respective second hash values match any of the first hash values.

An example non-transitory computer-readable medium can comprise instructions that, in response to execution, cause a system comprising a processor to perform operations. These operations can comprise, based on ingesting data from a storage system and to a retrieval-augmented generation system, querying a search system to identify at least one first portion of the data that has at least one respective third generation identifier that is greater than respective second generation identifiers in a state file, wherein the search system stores respective metadata of respective first data from the storage system, wherein the respective metadata comprises respective first generation identifiers that indicate respective updates to the respective first data, wherein the state file comprises pairs and first hash values, wherein respective pairs of the pairs comprise identifications of at least some respective first data stored in the storage system and the respective second generation identifiers that correspond to the respective data, and wherein respective first hash values of the first hash values correspond to the at least some respective first data. These operations can further comprise determining respective second hash values for respective second data of the at least one first portion of the data. These operations can further comprise identifying at least one second portion of the data for which the respective second hash values do not match any of the first hash values. These operations can further comprise ingesting the at least one second portion of the data into the retrieval-augmented generation system while refraining from ingesting at least one third portion of the data that has at least one respective fourth generation identifier that is less than or equal to the respective second generation identifiers in the state file, and while refraining from ingesting at least one fourth portion of the data for which the respective second hash values match any of the first hash values.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example state file that can facilitate deduplication in RAG ingestion versioning, in accordance with an embodiment of this disclosure;

FIG. 7 illustrates another example process flow that can facilitate deduplication in RAG ingestion versioning, in accordance with an embodiment of this disclosure;

DETAILED DESCRIPTION

Overview

Figure 1:
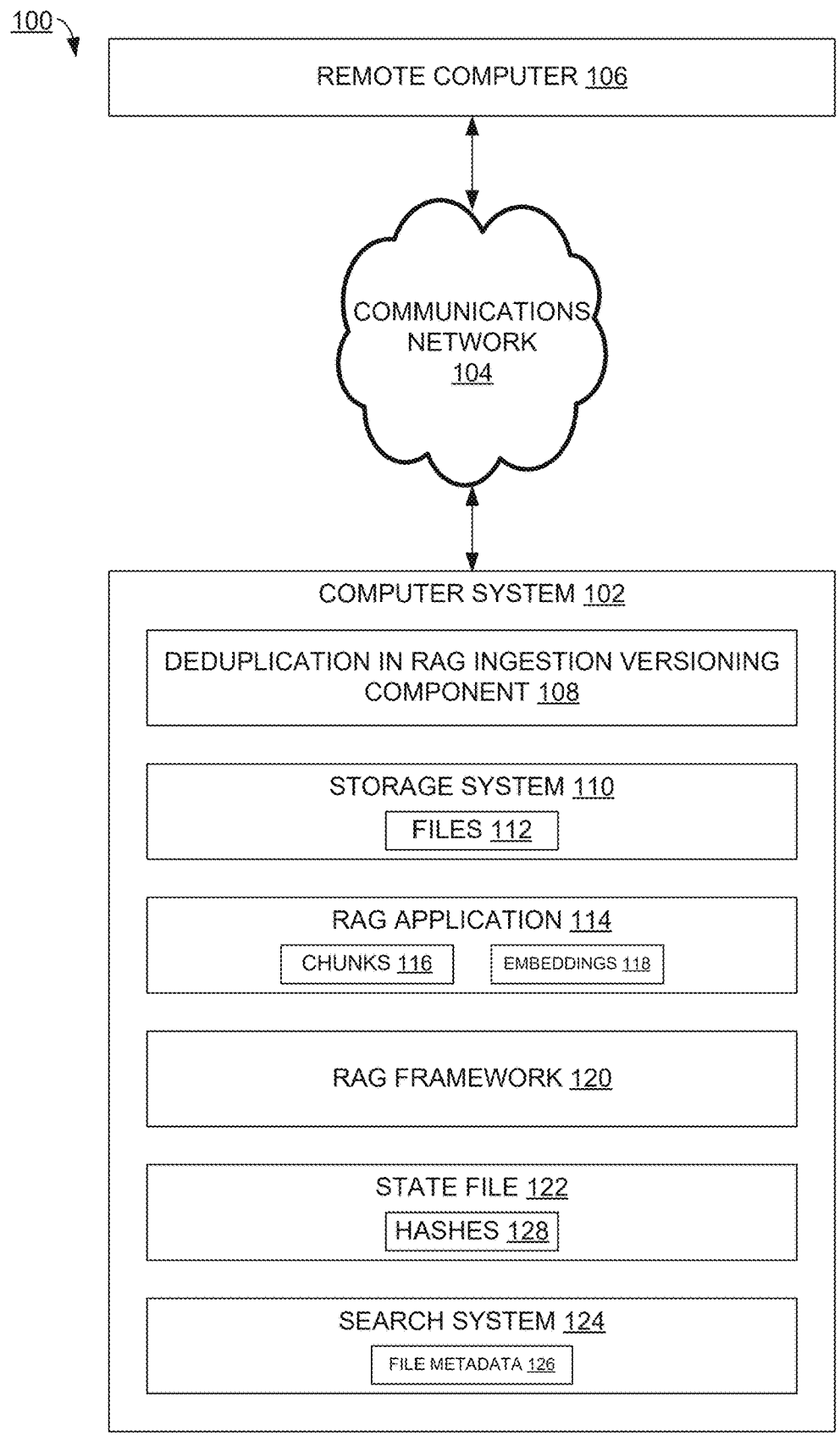
FIG. 1 illustrates an example system architecture that can facilitate deduplication in RAG ingestion versioning, in accordance with an embodiment of this disclosure.

In computer storage systems, there can be metadata index management. Metadata index management can comprise periodically exporting file system metadata from the computer storage system to a remote computer endpoint that can facilitate searching on that data.

It can be that metadata index management utilizes file backup snapshots (and an application programming interface (API) that facilitates determining differences between two snapshots).

The present techniques can implement metadata index management with artificial intelligence (AI) retrieval-augmented generation (RAG) systems to extend functionality, features, and integrations in accessing information about the files on a computer storage system.

A RAG framework can generally comprise a component that can read from source data and ingest it into a RAG application. There can be AI RAG frameworks that can read data from a computer storage system via various protocols (e.g., an object storage protocol or a network file storage (NFS) protocol. However, it can be that these frameworks do not keep track of which files were previously read, so do not perform detection of file changes.

A result can be a RAG framework that treats all data as brand new, regardless of whether 1 file or 1 billion files have changed. This can result in the RAG framework taking more time to process file changes, and consuming more compute and storage resources for a data ingestion process, compared with an implementation that does track file changes.

While it can be that prior protocols to read data from a computer storage system lack a mechanism to detect file changes, the computer storage system itself can track file changes.

The present techniques can be implemented to utilize metadata index management to create a document loader to a RAG framework that tracks which files have been processed and read by the RAG framework. When a RAG framework is re-run to ingest new data, the document loader can skip sending files that have already been processed, and instead send only those files that have not been processed by the RAG framework.

The present techniques can facilitate a reduction in time spent on re-ingesting data with a RAG framework, as well as a reduction in network, compute, and storage usage. This can enable data scientists to run a data processing workflow frequently, and enable use of this to trigger automated processing of changed files to create a real-time RAG.

It can be challenging for a person to determine which files have changed on a large system. Computer storage systems can store billions of files. Additionally, it can be that RAG frameworks lack an ability to track these files as the protocols they use (e.g., NFS) do not offer this feature.

The present techniques can be implemented with a connector for a RAG framework, which can be integrated with a computer storage system metadata index management feature.

What follows is a sample workflow according to the present techniques:

1. A computer storage system with metadata index management can be installed and configured to send results on a periodic bases to a remote search server.
2. A developer (e.g., a data scientist) can develop a RAG application using a RAG framework.
3. The developer can download and install a document loader for RAG framework according to the present techniques.
4. The developer can provide a hostname, credentials and path on a computer storage system to ingest data to the RAG framework and data loader (e.g., class arguments to the document loader). In some RAG frameworks, a document loader can comprise a plugin (e.g., a separate programming language class) that can be optionally used. Where the document loader comprises a class, the class arguments can comprise options and/or parameters (e.g., hostname, credentials, etc.).
5. The developer can run the RAG framework with the document loader.

6. The document loader can do the following:
   (A) Receive a hostname, credentials and path as input parameters, and verify that they are correct. There can be a fail where it is determined that the input parameters are not valid.
   (B) Read a state file maintained by the document loader and determine if the provided path was previously run.
      I. If the state files does not exist, or the path was never previously run, continue to step 6(D).
      II. If the state file exists and path was previously run, continue to step 6(C).
      III. A state file can comprise a list of computer storage system paths, along with a generation identifier (ID). The generation ID can comprise an incremental number that is updated each time a new entry is added, or an existing entry is updated in the database. It can be that a state file does not contain duplicate entries for the same path, and one state file is created per metadata index management instance
   (C) Issue a search system scroll query to find all entries that have a generation ID that is greater than the one from the previous one. Pass the list of files to step 5.
   (D) Pass the list of files or list of directories (paths) asynchronously to an existing RAG framework that processes data. In some examples, this can be done by chunking, embedding, etc.
   (E) Update the state file to record a highest generation ID document loader processed from step 6(D).

There can be scenarios where files are duplicated across a file system with the file being named differently or located in different paths/folders within a computer storage system.

It can be that a data connector keeps track of what files it has processed, but does not keep track of the content of what has been processed.

Where multiple copies of the same data exist, there can be a problem where a metadata index management component and a data connector treat each instance as a new entry to process. This can result in additional system resources and data being used to process data that is already present in a RAG system. Similarly, where two files are similar in nature, they can produce unique chunks that contain semantically duplicate information. This can result in skewed/biased results when it comes to using those chunks and embedding them in a RAG application.

The present techniques can address these problems. According to the present techniques, a data connector can produce a unique identifier (e.g., a hash) for each file it processes. It can then compare each unique identifier to previously processed data to determine if the file should be processed.

A data connector according to the present techniques can also create hashes of chunks that a RAG framework creates and tie that back to source data. When new data is processed, the data connector can take these chunks into account to determine if the entire file is to be used to create embeddings, or just portions of it.

Using the present techniques, semantic analysis can be performed on chunks, and they can be compared with previous chunks. By ranking the chunks based on similarity and quality of information, a decision can be made as to whether the older chunk or the newer chunk should be kept, while removing chunks that are semantically similar.

The present techniques can facilitate uniquely identifying a file using a hash function within a metadata index management scenario, performing a semantic search across new and older chunks, and ranking those chunks. The present techniques can also facilitate optimizing (or improving) an amount of information that is maintained in chunk store database, and/or vector database, thus improving storage utilization and improving RAG query processing latency. A data connector according to the present techniques can keep track of what files it has processed, as well as the data it processed, regardless of the file name and path.

A chunk store can be used by a RAG application and maintained separately from a RAG framework or RAG application. In some examples, a chunk store can be stored in a state file, as part of a search server, as key-value pairs in a database, in a memory structure, etc.

An example workflow according to the present techniques can be implemented as follows:
1. A metadata index management component stores file system metadata, along with filesystem access control lists (ACLs) and extended attributes into a search system database.
2. A data connector can determine whether a particular path has been processed before
3. If the path has never been processed before:
   a. For each new file, generate a hash (e.g., a SHA-1 hash) and store the hash as an entry in state file in the search system.
   b. When the RAG framework creates a chunk and stores it, create a hash of each chunk and store it along as a key/value pair in the chunk store, or in the search system database as an entry for the source file.
   c. Compare the current file with previously known hash and determine if a match exists. If it does, that can indicate that the file has been processed previously and can be skipped. If no match exists, return the file, and proceed to step 5.
4. If the path has been processed before:
   a. Read the state file and get hashes of past runs.
   b. Get the new files that have not been processed from metadata index management component.
   c. For each new file, determine a hash and compare that hash with previously known hashes. If a match exists, skip the file. If no match exists, proceed to step 5.
5. For files that do not have a match:
   a. Pass the file to a RAG framework for creating chunks of the file.
   b. After creating each chunk, generate a unique hash and save the hash along with the chunk to the chunk store or back in the search system database as an entry for the source file.
   c. Before creating the embedding, check to see if the newly created hash matches any existing previously saved hashes in the chunk store. If a match exists, skip creating the embedding. If no match exists, create the embedding.
6. For every new chunk that is created:
   a. Produce a vector, perform a semantic search on the existing data, and rank the results, in order.
   b. Produce a threshold value (e.g., 95% similarity) in which results that meet or exceed this threshold can be considered to be "duplicate."
   c. For each "duplicate result," find a corresponding chunk and vector recorded, and delete it.
   d. Insert the new chunk and pass the data to the rest of the RAG framework (e.g., create a vector, etc.).

Example Architectures, Etc.

FIG. 1 illustrates an example system architecture 100 that can facilitate deduplication in RAG ingestion versioning, in accordance with an embodiment of this disclosure.

System architecture 100 comprises computer system 102, communications network 104, and remote computer 106. In turn, computer system 102 comprises deduplication in RAG ingestion versioning component 108, storage system 110 (which comprises files 112), RAG application 114 (which comprises chunks 116 and embeddings 118), RAG framework 120, state file 122 (which comprises processed chunk hashes 128), and search system 124 (which comprises file metadata 126).

Figure 13:
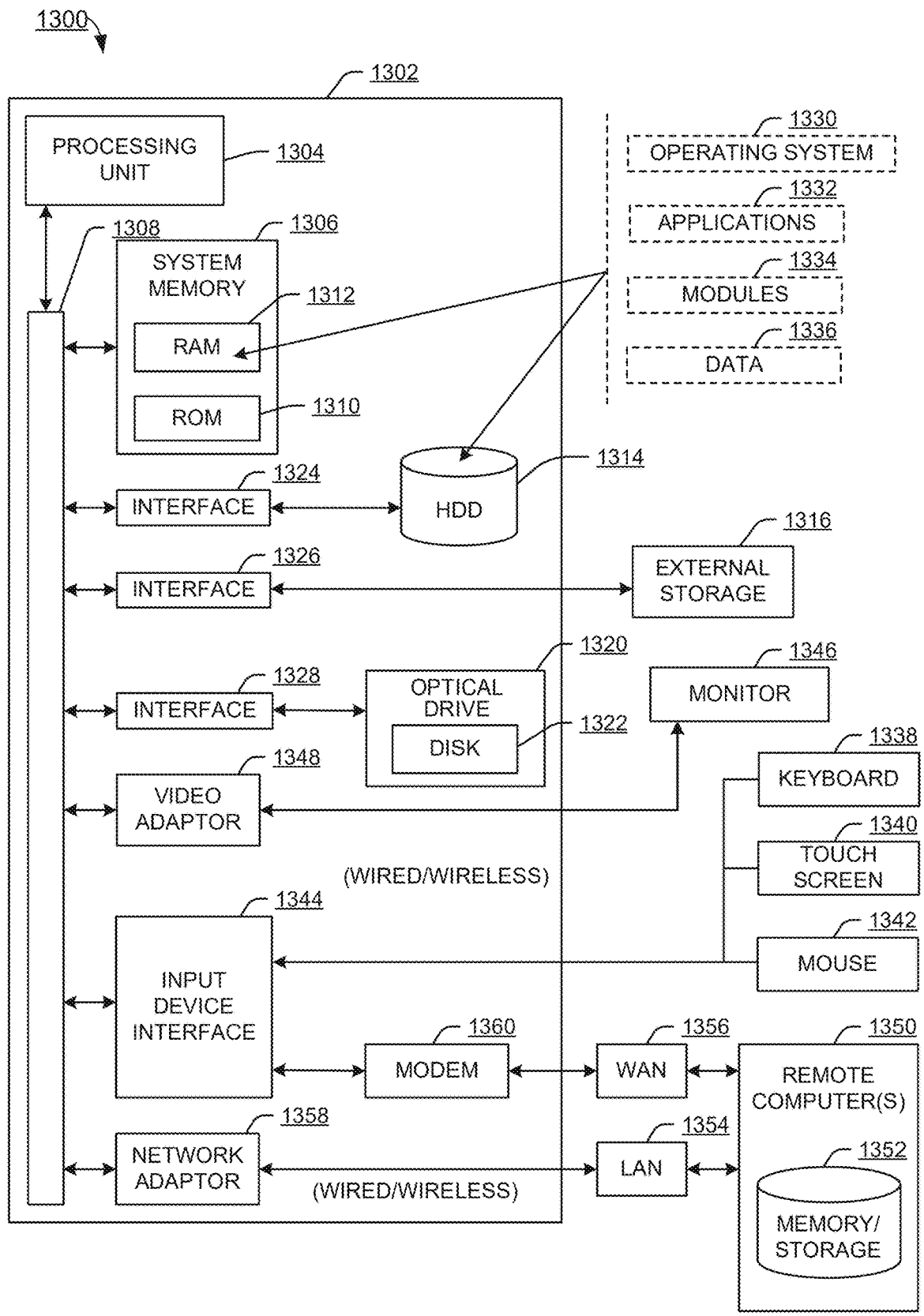
FIG. 13 illustrates an example block diagram of a computer operable to execute an embodiment of this disclosure.

Each of computer system 102 and/or remote computer 106 can be implemented with part(s) of computing environment 1300 of FIG. 13. Communications network 104 can comprise a computer communications network, such as the Internet, or an isolated private computer communications network.

RAG application 114 can respond to queries based on information in files 112 stored in storage system 110. RAG application can store information in files 112 as chunks 116 (where a file can comprise multiple chunks) and embeddings 118 (where an embedding can comprise a numerical vector representation of a chunk, and wherein a similarity search between a vector representation of a query and the embeddings can be performed as part of a RAG application responding to the query).

RAG framework 120 (in conjunction with deduplication in RAG ingestion versioning component 108) can ingest files 112 into RAG application 114. That is, RAG framework 120 can copy the data of files 112 to RAG application 114, including creating chunks and embeddings from files 112. In doing so, RAG framework 120 can perform versioning on the files so that only new or updated files are ingested, which can save on bandwidth and processing resources in ingesting data.

To do this, RAG framework 120 can maintain state file 122, which can include information about files 112 and a most-recent version (e.g., a generation ID) that has been ingested into RAG application 114. When performing an ingestion, RAG framework 120 can access search system 124, which can store indexed (that is, more easily searchable than unindexed data) metadata for files 112 as file metadata 126 (where storage system 110 does not index file metadata). RAG framework 120 can use file metadata 126 to determine which files have been updated since a last ingest, and ingest only those files from files 112.

In some examples, deduplication in RAG ingestion versioning component 108 can perform this identification of new/updated files, and pass a list of those files to RAG framework 120 for ingesting.

Where a file does not have a match, it can be chunked (such as by RAG framework 120, RAG ingestion versioning component 108, or another part of system architecture 100), and a hash value can be created for each chunk (where a hash value can comprise an output of a hash function that converts an input of arbitrary data into a hash value). Where a newly-created hash value matches a hash value of processed chunk hashes 128 that is stored in state file 122, then it can be determined that a duplicate chunk has already been ingested into the RAG application, and this new chunk need not be ingested.

Where a chunk is not a duplicate, a vector of it can be created (such as by RAG framework 120, RAG ingestion versioning component 108, or another part of system architecture 100), a semantic search can be performed based on that vector with corresponding vectors of already-ingested chunks, and a ranking of the quality of similar vectors/chunks can be performed, where chunks that are sufficiently similar (e.g., 95% similar) but not top-ranked can be deleted from a chunk store of RAG application 114.

With ingested data, RAG application 114 can respond to queries that remote computer 106 makes to it via communications network 104.

In some examples, storage system 110 can, on a regular interval, transfer all new/modified metadata into search system 124. Each time this occurs, a generation ID for that new/modified metadata can be incremented. A query can be performed on search system 124 for entries that are larger than a generation ID identified in state file, and the returned entries (files and/or paths), can be deduplicated at the file/chunk level, and can be returned to RAG framework 120.

In some examples, deduplication in RAG ingestion versioning component 108 can implement part(s) of the process flows of FIGS. 5-12 to facilitate deduplication in RAG ingestion versioning.

It can be appreciated that system architecture 100 is one example system architecture for deduplication in RAG ingestion versioning, and that there can be other system architectures that facilitate deduplication in RAG ingestion versioning.

Figure 2:
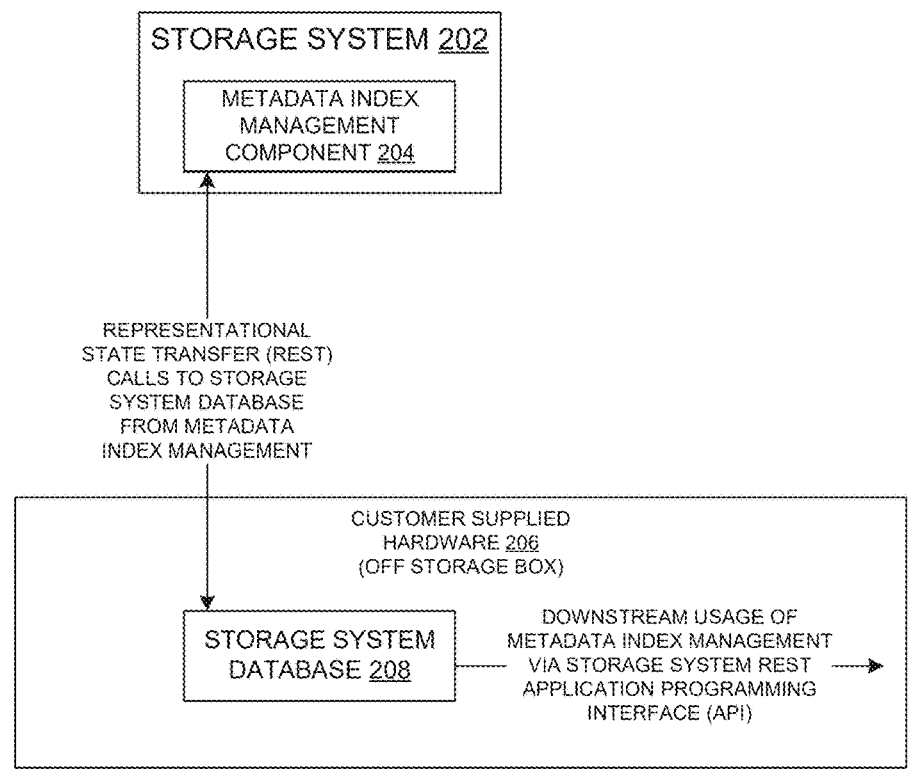
FIG. 2 illustrates another example system architecture that can facilitate deduplication in RAG ingestion versioning, in accordance with an embodiment of this disclosure.

FIG. 2 illustrates another example system architecture 200 that can facilitate deduplication in RAG ingestion versioning, in accordance with an embodiment of this disclosure. In some examples, part(s) of system architecture 200 can be implemented by part(s) of system architecture 100 to facilitate deduplication in RAG ingestion versioning.

System architecture 200 comprises storage system 202, metadata index management component 204, customer supplied hardware 206 (off storage box), storage system database 208, and deduplication in RAG ingestion versioning component 210 (which can be similar to deduplication in RAG ingestion versioning component 108 of FIG. 1).

In system architecture 200, it can be that there is not a facility to implement ingestion versioning (with or without deduplication), such as because the protocol used to ingest data does not maintain a state of a previous ingestion. This can be addressed in system architecture 300 of FIG. 3, with the use of state file 320, among other components.

Figure 3:
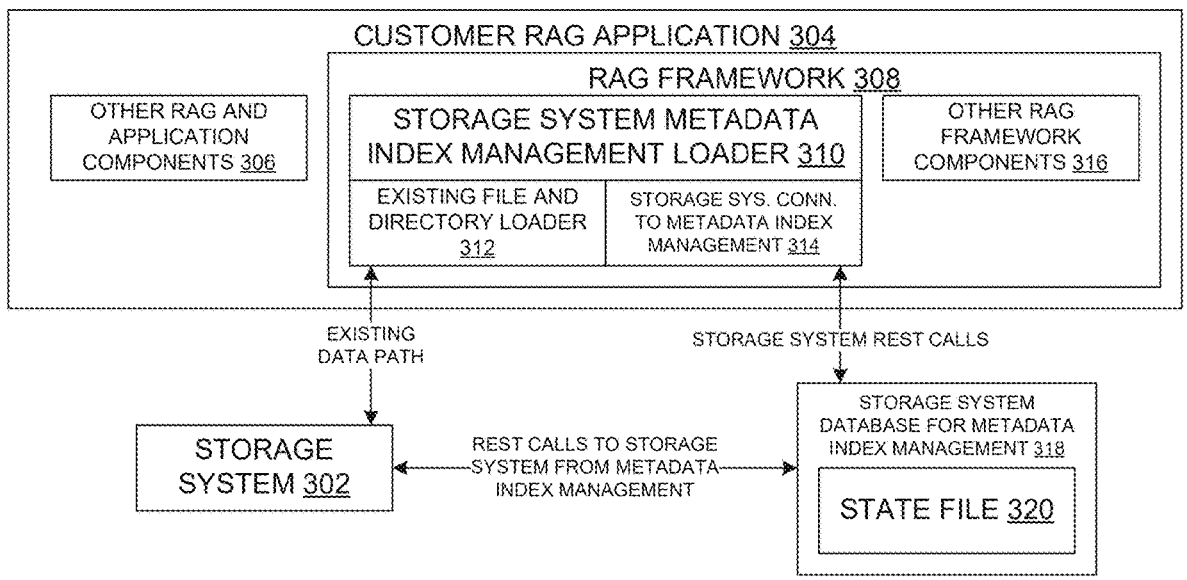
FIG. 3 illustrates another example system architecture that can facilitate deduplication in RAG ingestion versioning, in accordance with an embodiment of this disclosure.

FIG. 3 illustrates another example system architecture 300 that can facilitate deduplication in RAG ingestion versioning, in accordance with an embodiment of this disclosure. In some examples, part(s) of system architecture 300 can be implemented by part(s) of system architecture 100 to facilitate deduplication in RAG ingestion versioning.

System architecture 300 comprises storage system 302, customer RAG application 304, other RAG and application components 306, RAG framework 308, storage system metadata index management loader 310, existing file and directory loader 312, storage system connector to metadata index management 314, other RAG framework components 316, storage system database for metadata index management 318, and state file 320.

FIG. 4 illustrates an example state file 400 that can facilitate deduplication in RAG ingestion versioning, in accordance with an embodiment of this disclosure. In some examples, part(s) of state file 400 can be implemented by part(s) of system architecture 100 to facilitate deduplication in RAG ingestion versioning.

State file 400 can be similar to state file 320 of FIG. 3, and can indicate a last version ("generation") of different files and/or paths that have been ingested into a RAG application.

State file 400 can also store hash values for chunks that have been previously-ingested (and are currently in use) by a RAG application.

Example Process Flows

Figure 5:
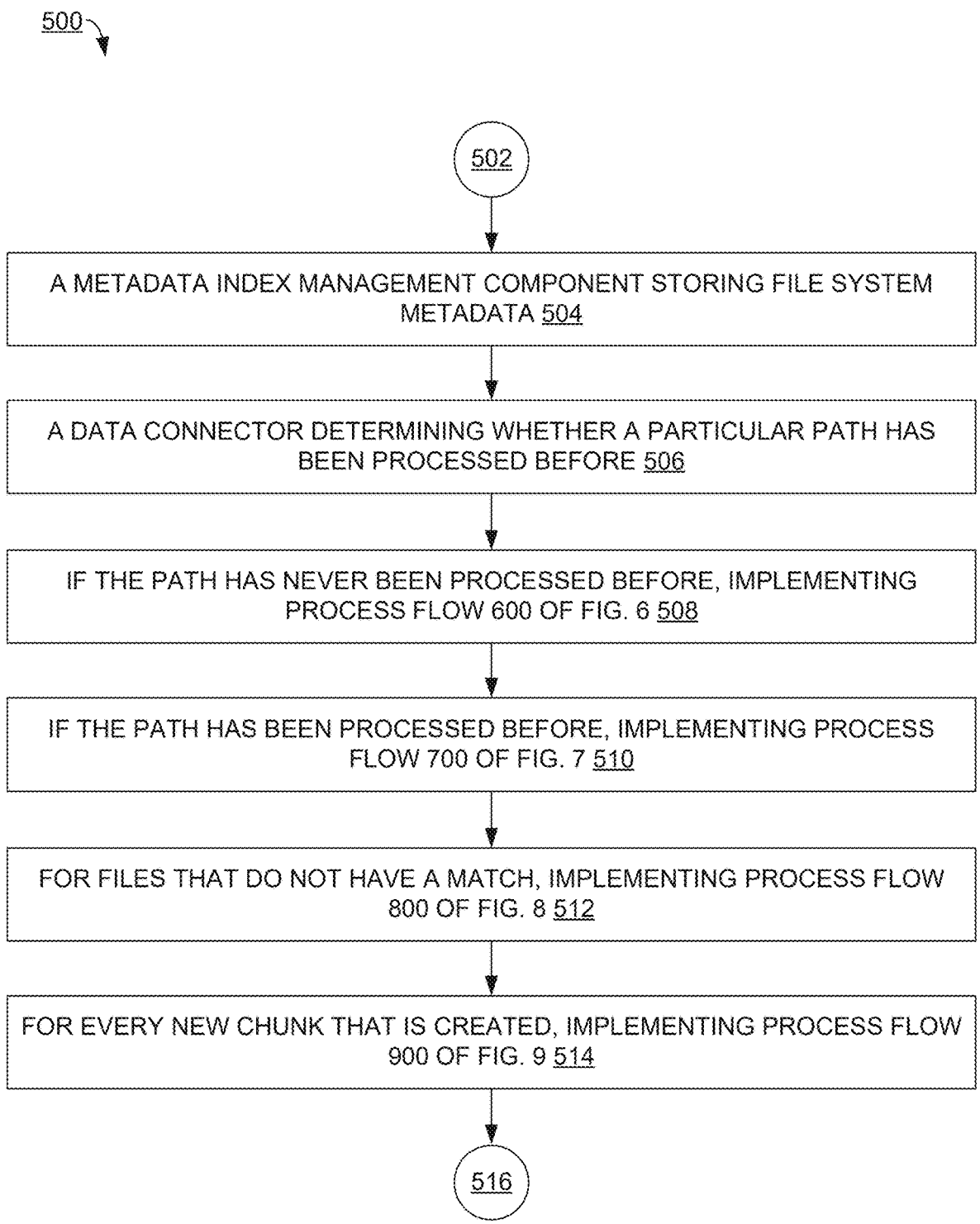
FIG. 5 illustrates an example process flow that can facilitate deduplication in RAG ingestion versioning, in accordance with an embodiment of this disclosure.

FIG. 5 illustrates an example process flow 500 that can facilitate deduplication in RAG ingestion versioning, in accordance with an embodiment of this disclosure. In some examples, one or more embodiments of process flow 500 can be implemented by system architecture 100 of FIG. 1, or computing environment 1300 of FIG. 13.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 500 begins with 502, and moves to operation 504.

Operation 504 depicts a metadata index management component storing file system metadata. This can include storing filesystem access control lists (ACLs) and extended attributes into a search system database.

After operation 504, process flow 500 moves to operation 506.

Operation 506 depicts a data connector determining whether a particular path has been processed before.

After operation 506, process flow 500 moves to operation 508.

Figure 6:
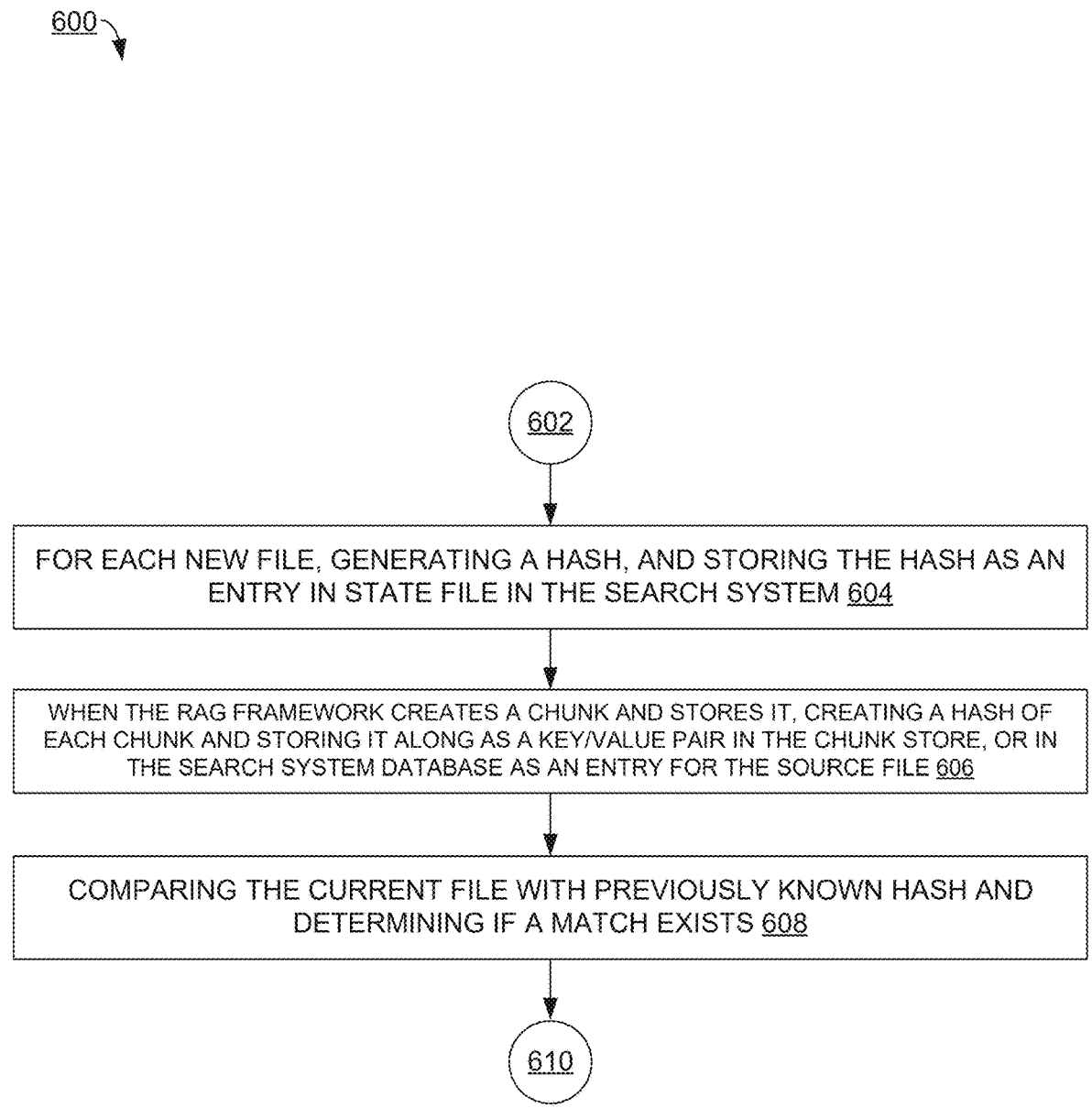
FIG. 6 illustrates another example process flow that can facilitate deduplication in RAG ingestion versioning, in accordance with an embodiment of this disclosure.

Operation 508 depicts, if the path has never been processed before, implementing process flow 600 of FIG. 6.

After operation 508, process flow 500 moves to operation 510.

Operation 510 depicts, if the path has been processed before, implementing process flow 700 of FIG. 7.

After operation 510, process flow 500 moves to operation 512.

Figure 8:
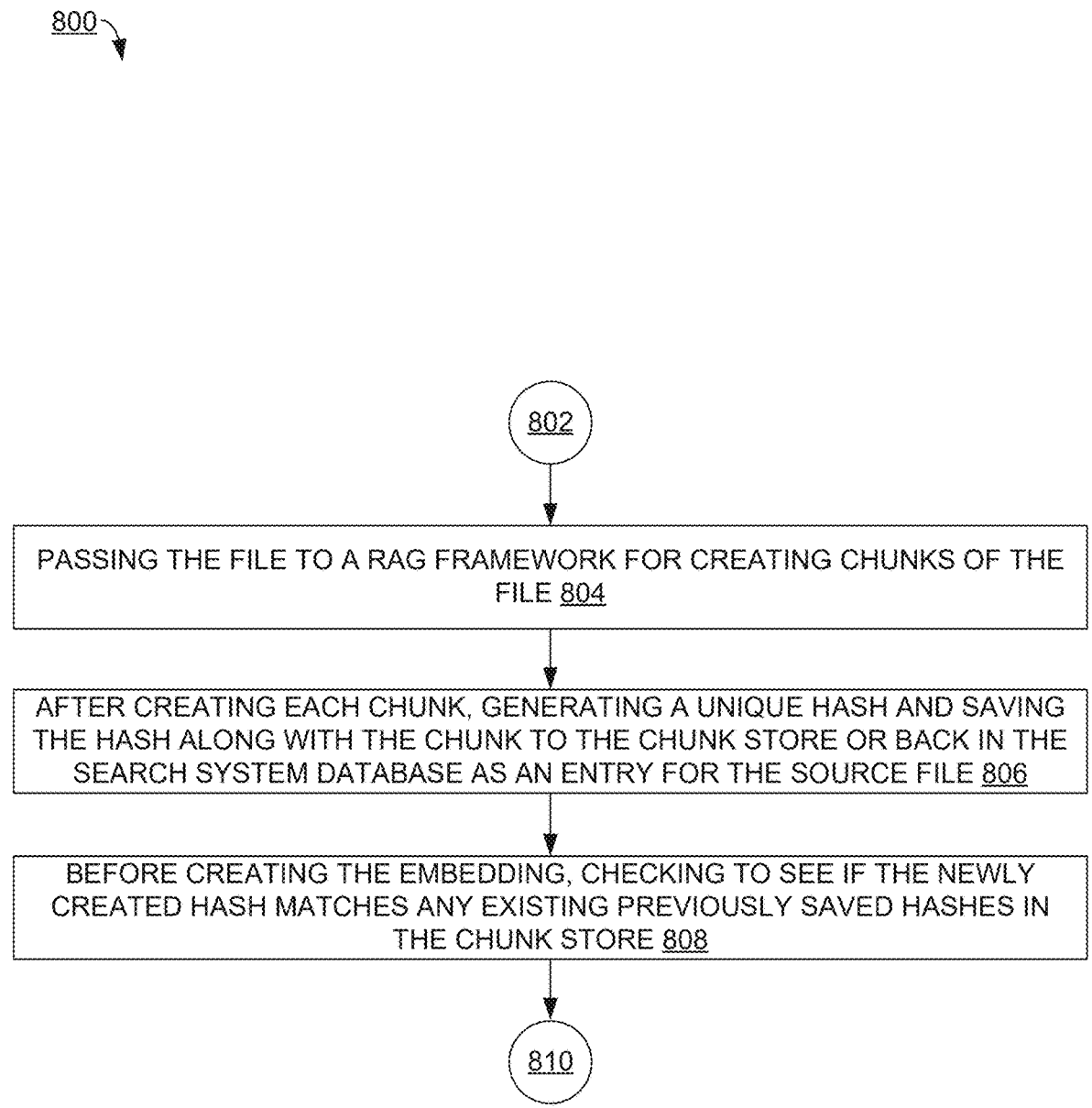
FIG. 8 illustrates another example process flow that can facilitate deduplication in RAG ingestion versioning, in accordance with an embodiment of this disclosure.

Operation 512 depicts, for files that do not have a match, implementing process flow 800 of FIG. 8.

After operation 512, process flow 500 moves to operation 514.

Figure 9:
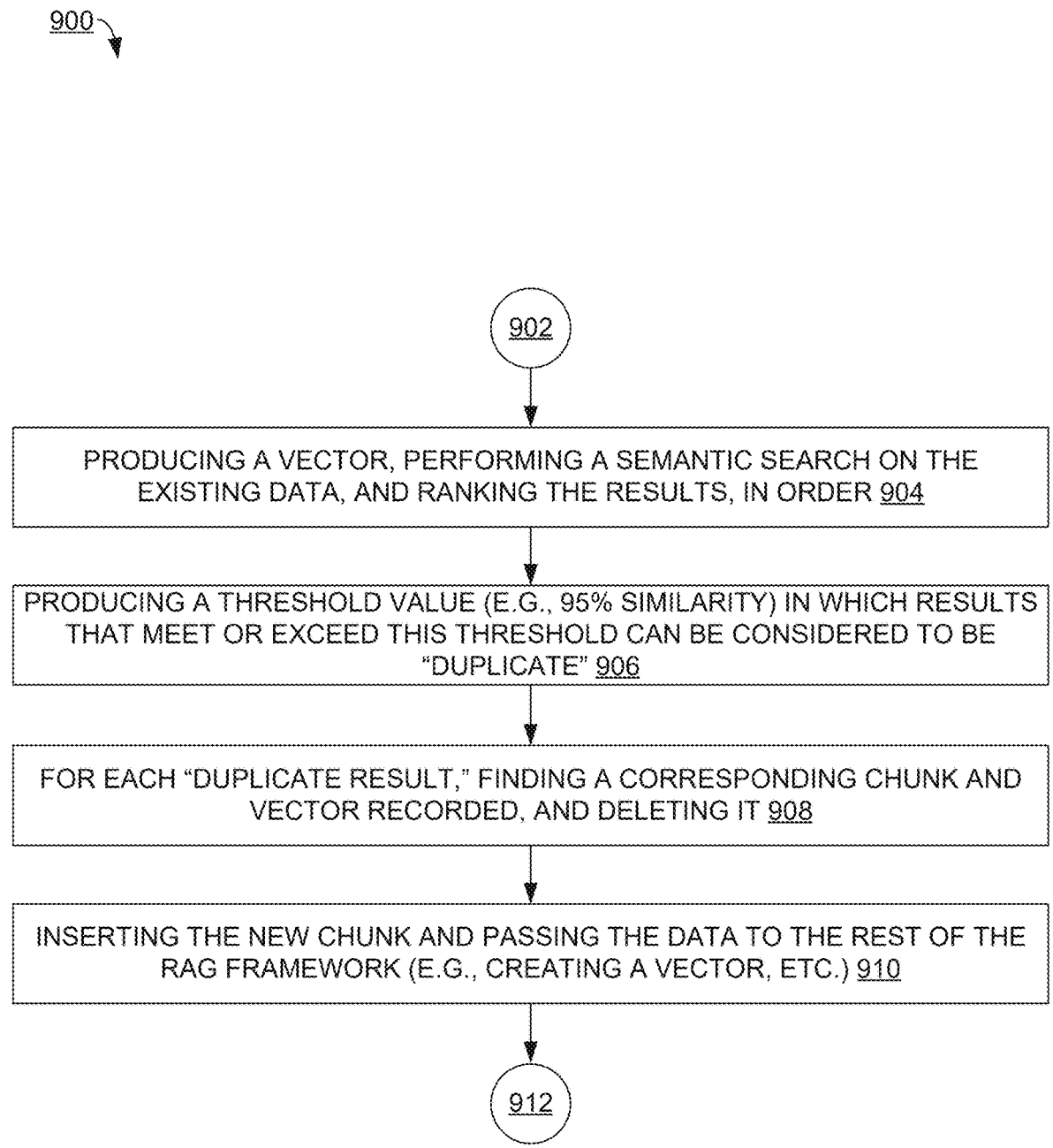
FIG. 9 illustrates another example process flow that can facilitate deduplication in RAG ingestion versioning, in accordance with an embodiment of this disclosure.

Operation 514 depicts, for every new chunk that is created, implementing process flow 900 of FIG. 9.

After operation 514, process flow 500 moves to 516, where process flow 500 ends.

FIG. 6 illustrates another example process flow 600 that can facilitate deduplication in RAG ingestion versioning, in accordance with an embodiment of this disclosure. In some examples, one or more embodiments of process flow 600 can be implemented by system architecture 100 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of process flow 500 of FIG. 5, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

In some examples, process flow 600 can be implemented as part of operation 514 of FIG. 5 to facilitate selectively ingesting files via the RAG framework.

Process flow 600 can be implemented to facilitate operation 508.

Process flow 600 begins with 602, and moves to operation 604.

Operation 604 depicts, for each new file, generating a hash, and storing the hash as an entry in state file in the search system.

After operation 604, process flow 600 moves to operation 606.

Operation 606 depicts, when the RAG framework creates a chunk and stores it, creating a hash of each chunk and storing it along as a key/value pair in the chunk store, or in the search system database as an entry for the source file.

After operation 606, process flow 600 moves to operation 608.

Operation 608 depicts comparing the current file with previously known hash and determining if a match exists. If it does, that can indicate that the file has been processed previously and can be skipped. If no match exists, return the file, and proceed to operation 512 (which can be implemented with process flow 800 of FIG. 8).

After operation 608, process flow 600 moves to 610, where process flow 600 ends.

FIG. 7 illustrates another example process flow 700 that can facilitate deduplication in RAG ingestion versioning, in accordance with an embodiment of this disclosure. In some examples, one or more embodiments of process flow 700 can be implemented by system architecture 100 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 500 of FIG. 5, process flow 600 of FIG. 6, process flow 800 of FIG. 8, process flow 900 of FIG. 9, process flow 1000 of FIG. 10, process flow 1100 of FIG. 11, and/or process flow 1200 of FIG. 12.

Process flow 700 can be implemented to facilitate operation 510.

Process flow 700 begins with 702, and moves to operation 704.

Operation 704 depicts reading the state file and getting hashes of past runs. The hashes of past runs can be hashes of chunks that are currently stored by the RAG application.

After operation 704, process flow 700 moves to operation 706.

Operation 706 depicts getting the new files that have not been processed from metadata index management component.

After operation 706, process flow 700 moves to operation 708.

Operation 708 depicts, for each new file, determining a hash and comparing that hash with previously known hashes. If a match exists, skip the file. If no match exists, proceed to operation 512 (which can be implemented with process flow 800 of FIG. 8).

After operation 708, process flow 700 moves to 710, where process flow 700 ends.

FIG. 8 illustrates another example process flow 800 that can facilitate deduplication in RAG ingestion versioning, in accordance with an embodiment of this disclosure. In some examples, one or more embodiments of process flow 800 can be implemented by system architecture 100 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 500 of FIG. 5, process flow 600 of FIG. 6, process flow 700 of FIG. 7, process flow 900 of FIG. 9, process flow 1000 of FIG. 10, process flow 1100 of FIG. 11, and/or process flow 1200 of FIG. 12.

Process flow 800 can be implemented to facilitate operation 512.

Process flow 800 begins with 802, and moves to operation 804.

Operation 804 depicts passing the file to a RAG framework for creating chunks of the file.

After operation 804, process flow 800 moves to operation 806.

Operation 806 depicts, after creating each chunk, generating a unique hash and saving the hash along with the chunk to the chunk store or back in the search system database as an entry for the source file.

After operation 806, process flow 800 moves to operation 808.

Operation 808 depicts, before creating the embedding, checking to see if the newly created hash matches any existing previously saved hashes in the chunk store. If a match exists, skip creating the embedding. If no match exists, create the embedding.

After operation 808, process flow 800 moves to 810, where process flow 800 ends.

FIG. 9 illustrates another example process flow 900 that can facilitate deduplication in RAG ingestion versioning, in accordance with an embodiment of this disclosure. In some examples, one or more embodiments of process flow 900 can be implemented by system architecture 100 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 500 of FIG. 5, process flow 600 of FIG. 6, process flow 700 of FIG. 7, process flow 800 of FIG. 8 process flow 1000 of FIG. 10, process flow 1100 of FIG. 11, and/or process flow 1200 of FIG. 12.

Process flow 900 can be implemented to facilitate operation 512.

Process flow 900 begins with 902, and moves to operation 904.

Operation 904 depicts producing a vector, performing a semantic search on the existing data, and ranking the results, in order.

After operation 904, process flow 900 moves to operation 906.

Operation 906 depicts producing a threshold value (e.g., 95% similarity) in which results that meet or exceed this threshold can be considered to be "duplicate."

After operation 906, process flow 900 moves to operation 908.

Operation 908 depicts, for each "duplicate result," finding a corresponding chunk and vector recorded, and deleting it.

After operation 908, process flow 900 moves to operation 910.

Operation 910 depicts inserting the new chunk and passing the data to the rest of the RAG framework (e.g., creating a vector, etc.).

After operation 910, process flow 900 moves to 912, where process flow 900 ends.

Figure 10:
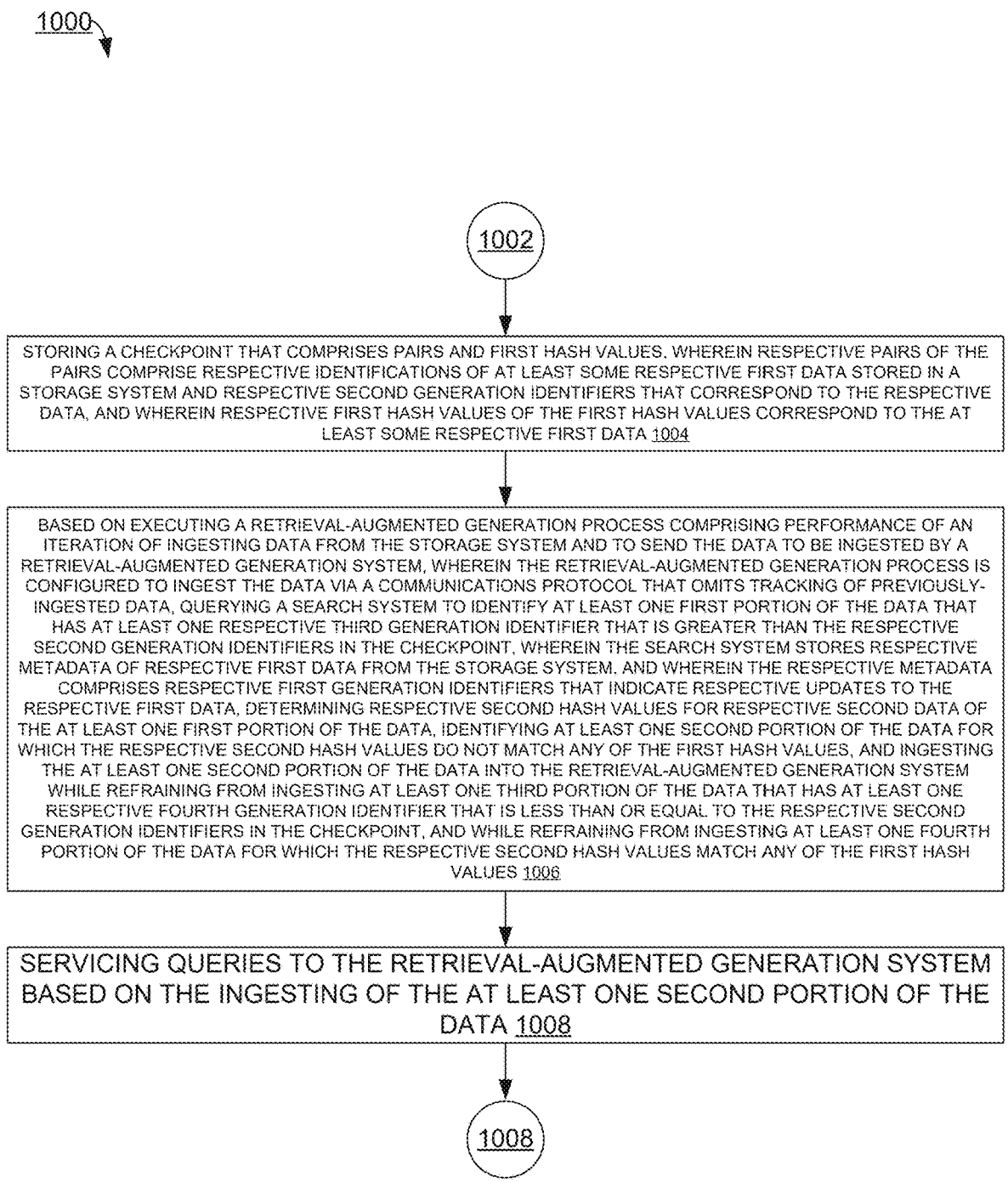
FIG. 10 illustrates another example process flow that can facilitate deduplication in RAG ingestion versioning, in accordance with an embodiment of this disclosure.

FIG. 10 illustrates another example process flow 1000 that can facilitate deduplication in RAG ingestion versioning, in accordance with an embodiment of this disclosure. In some examples, one or more embodiments of process flow 1000 can be implemented by system architecture 100 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 500 of FIG. 5, process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts storing a checkpoint that comprises pairs and first hash values, wherein respective pairs of the pairs comprise respective identifications of at least some respective first data stored in a storage system and respective second generation identifiers that correspond to the respective data, and wherein respective first hash values of the first hash values correspond to the at least some respective first data. Using the example of FIG. 1, the checkpoint can be similar to state file 122 of FIG. 1, and the storage system can be similar to storage system 110.

After operation 1004, process flow 1000 moves to operation 1006.

Operation 1006 depicts, based on executing a retrieval-augmented generation process comprising performance of an iteration of ingesting data from the storage system and to send the data to be ingested by a retrieval-augmented generation system, wherein the retrieval-augmented generation process is configured to ingest the data via a communications protocol that omits tracking of previously-ingested data, querying a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data, determining respective second hash values for respective second data of the at least one first portion of the data, identifying at least one second portion of the data for which the respective second hash values do not match any of the first hash values, and ingesting the at least one second portion of the data into the retrieval-augmented generation system while refraining from ingesting at least one third portion of the data that has at least one respective fourth generation identifier that is less than or equal to the respective second generation identifiers in the checkpoint, and while refraining from ingesting at least one fourth portion of the data for which the respective second hash values match any of the first hash values. Continuing with the example of FIG. 1, the retrieval-augmented generation process can be similar to RAG framework 120, the retrieval-augmented generation system can be similar to RAG application 114, and the search system can be similar to search system 124.

In some examples, the ingesting of the at least one second portion of the data comprises generating chunks from the at least one second portion of the data, determining respective third hash values for the respective chunks, and in response to a third hash value of the third hash values matching any of fourth hash values that correspond to previously-ingested chunks, refraining from ingesting a chunk of the respective chunks that corresponds to the third hash value. That is, chunks can be hashed, and they can be selectively-ingested based on whether an identical chunk is already being used by the RAG application.

In some examples, the generating of the chunks from the at least one second portion of the data comprises creating respective first embeddings for the respective chunks while refraining from creating second embeddings for the chunk. That is, a determination of whether to ingest a chunk can be made before embeddings for that chunk are created.

In some examples, the chunk is a first chunk, the at least one second portion of the data comprises a file, the file comprises the first chunk and a second chunk, and operation 1106 comprises ingesting the second chunk of the file while performing the refraining from ingesting the first chunk of the file. That is, for one file, some chunks can be ingested, and other chunks can be not ingested.

In some examples, the ingesting of the at least one second portion of the data comprises generating chunks from the at least one second portion of the data, and refraining from ingesting a first chunk of the chunks that satisfies a similarity criterion with respect to a second chunk that has been ingested prior to the iteration of the ingesting of the data. In some examples, the first chunk differs from the second chunk. That is, determining whether a chunk is to be ingested can be made based on whether the RAG application is already using a sufficiently-similar chunk, where the two chunks are not identical.

In some examples, the similarity criterion is based on a semantic analysis of the first chunk relative to the second chunk. That is, semantic analysis—an analysis of the meaning of the data (e.g., what idea is conveyed via text)—can be implemented to determine whether to ingest a chunk.

In some examples, the refraining from the ingesting of the first chunk is based on the second chunk having a higher ranking than the first chunk according to a quality of information criterion. That is, determining which of similar chunks to keep can be based on ranking the quality of information of the chunks.

In some examples, the ingesting of the at least one second portion of the data comprises generating chunks from the at least one second portion of the data, and removing a second chunk from a chunk store that is associated with the retrieval-augmented generation system based on a first chunk of the chunks satisfying a similarity criterion with respect to the second chunk. That is, where a new chunk is to be ingested into a RAG application, an already-ingested and semantically-similar chunk can be removed.

After operation 1006, process flow 1000 moves to operation 1008.

Operation 1008 depicts servicing queries to the retrieval-augmented generation system based on the ingesting of the at least one second portion of the data. That is, a RAG system can receive queries and process them to produce a response. This can be done based on information in the at least one second portion of the data.

After operation 1008, process flow 1000 moves to 1010, where process flow 1000 ends.

Figure 11:
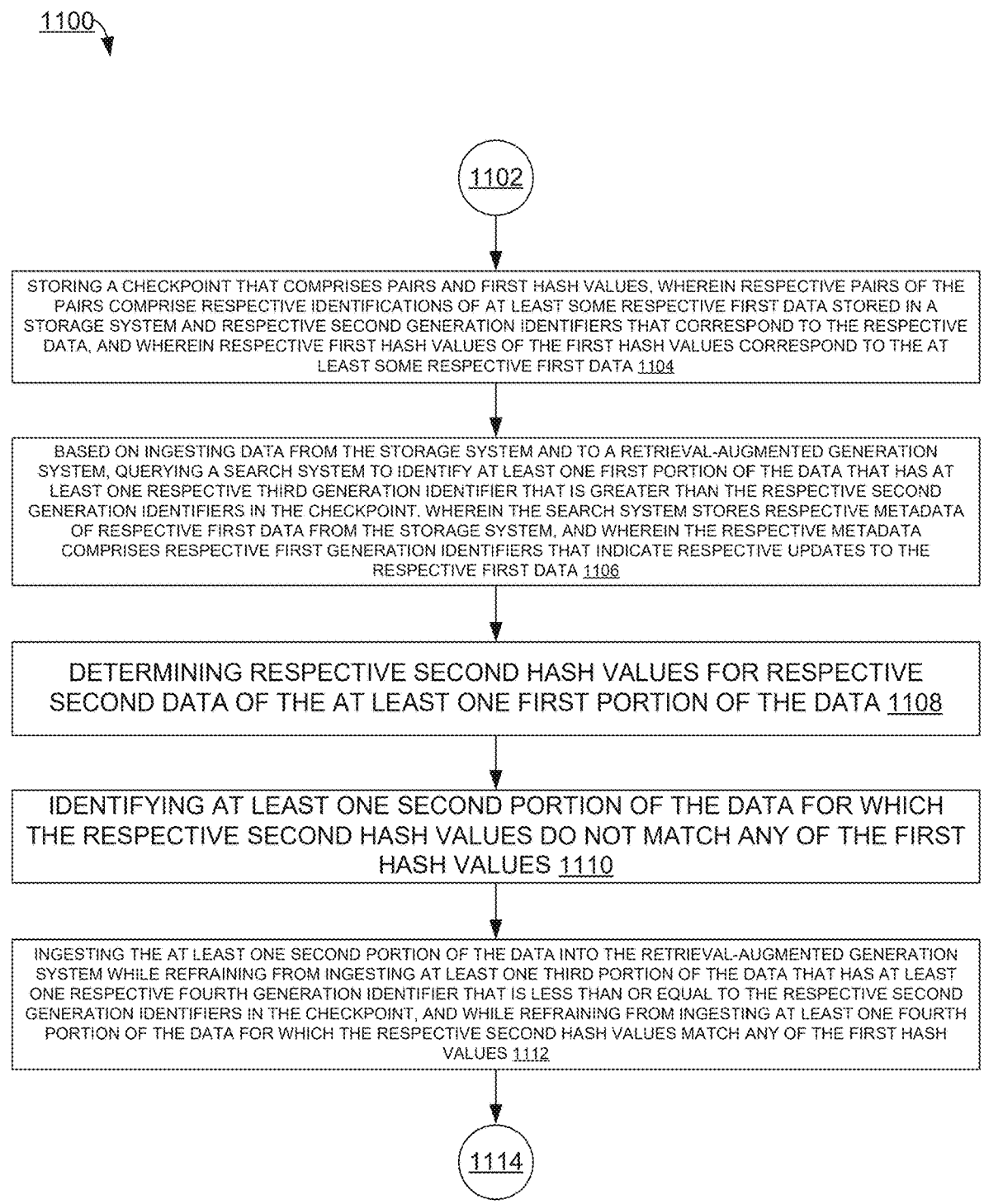
FIG. 11 illustrates another example process flow that can facilitate deduplication in RAG ingestion versioning, in accordance with an embodiment of this disclosure.

FIG. 11 illustrates another example process flow 1100 that can facilitate deduplication in RAG ingestion versioning, in accordance with an embodiment of this disclosure. In some examples, one or more embodiments of process flow 1100 can be implemented by system architecture 100 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1200 of FIG. 12. Process flow 1100 begins with 1102, and moves to operation 1104.

Operation 1104 depicts storing a checkpoint that comprises pairs and first hash values, wherein respective pairs of the pairs comprise respective identifications of at least some respective first data stored in a storage system and respective second generation identifiers that correspond to the respective data, and wherein respective first hash values of the first hash values correspond to the at least some respective first data. In some examples, operation 1104 can be implemented in a similar manner as operation 1004 of FIG. 10.

After operation 1104, process flow 1100 moves to operation 1106.

Operation 1106 depicts, based on ingesting data from the storage system and to a retrieval-augmented generation system, querying a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data. In some examples, operation 1106 can be implemented in a similar manner as operation 1004 of FIG. 10, as applied to querying a search system.

After operation 1106, process flow 1100 moves to operation 1108.

Operation 1108 depicts determining respective second hash values for respective second data of the at least one first portion of the data. In some examples, operation 1108 can be implemented in a similar manner as operation 1004 of FIG. 10, as applied to determining hash values.

After operation 1108, process flow 1100 moves to operation 1110.

Operation 1110 depicts identifying at least one second portion of the data for which the respective second hash values do not match any of the first hash values. In some examples, operation 1206 can be implemented in a similar manner as operation 1004 of FIG. 10, as applied to identifying the at least one second portion of the data.

In some examples, the identifying of the at least one second portion of the data for which the respective second hash values do not match any of the first hash values occurs independently of respective first locations of the at least one second portion of the data, and occurs independently of respective second locations of the at least one first portion of the data that correspond to the respective first hash values. That is, it can be that the location of a file within a storage system does not affect the operation of a RAG application, so a match between two files at different file system locations can still be considered duplicate files, where ingesting both files would be considered duplicative.

After operation 1110, process flow 1100 moves to operation 1112.

Operation 1112 depicts ingesting the at least one second portion of the data into the retrieval-augmented generation system while refraining from ingesting at least one third portion of the data that has at least one respective fourth generation identifier that is less than or equal to the respective second generation identifiers in the checkpoint, and while refraining from ingesting at least one fourth portion of the data for which the respective second hash values match any of the first hash values. In some examples, operation 1206 can be implemented in a similar manner as operation 1004 of FIG. 10, as applied to ingesting the at least one second portion of the data.

In some examples, the ingesting of the data is a first iteration of the ingesting of the data, and operation 1112 comprises, based on performing a second iteration of the ingesting of the data, wherein the second iteration occurs prior to the first iteration, and based on determining, from the checkpoint, that respective third data of at least a third portion of the data has not previously been ingested, creating respective third hash values for the respective third data, and storing the respective third hash values in the checkpoint. That is, a hash can be generated for each file where a path of a storage system has not been ingested before.

In some examples, the pairs are first pairs, the ingesting of the data is a first iteration of the ingesting of the data, and operation 1112 comprises, based on performing a second iteration of the ingesting of the data, wherein the second iteration occurs prior to the first iteration, and based on determining, from the checkpoint, that respective third data of at least a third portion of the data has not previously been ingested, creating respective third hash values for respective chunks of the respective third data, and storing respective second pairs comprising the respective third hash values and the respective chunks. In some examples, the respective second pairs are stored in a chunk store that is associated with the retrieval-augmented generation process. In some examples, the respective second pairs are stored in the search system. That is, when a chunk is created and stored, a hash of the chunk can be created and stored with the chunk as a key-value pair in a chunk store or in a search system as an entry for the corresponding file from which the chunk was created.

After operation 1112, process flow 1100 moves to 1114, where process flow 1100 ends.

Figure 12:
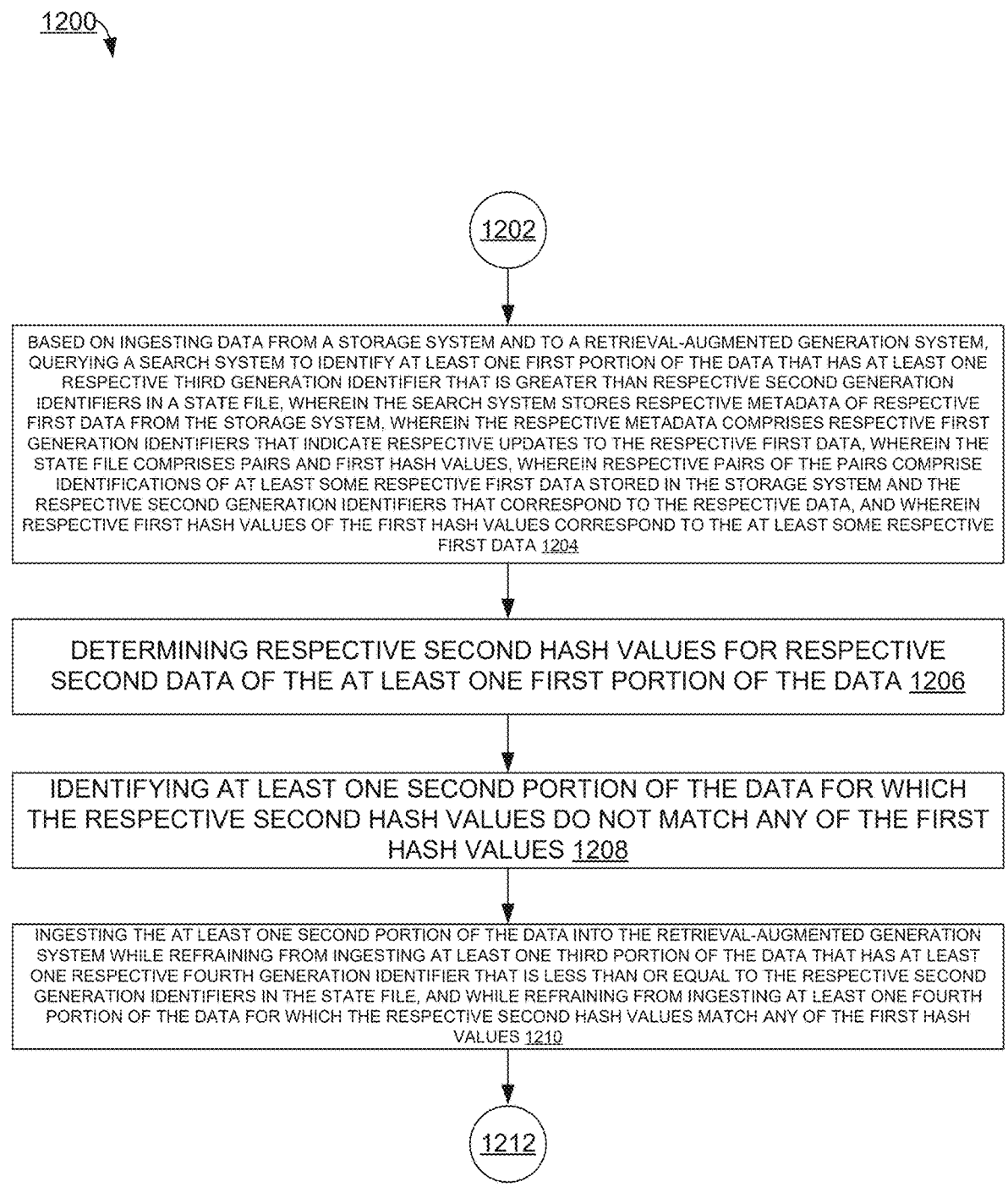
FIG. 12 illustrates another example process flow that can facilitate deduplication in RAG ingestion versioning, in accordance with an embodiment of this disclosure.

FIG. 12 illustrates another example process flow 1200 that can facilitate deduplication in RAG ingestion versioning, in accordance with an embodiment of this disclosure. In some examples, one or more embodiments of process flow 1200 can be implemented by system architecture 120 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 1200 begins with 1202, and moves to operation 1204.

Operation 1204 depicts, based on ingesting data from a storage system and to a retrieval-augmented generation system, querying a search system to identify at least one first portion of the data that has at least one respective third generation identifier that is greater than respective second generation identifiers in a state file, wherein the search system stores respective metadata of respective first data from the storage system, wherein the respective metadata comprises respective first generation identifiers that indicate respective updates to the respective first data, wherein the state file comprises pairs and first hash values, wherein respective pairs of the pairs comprise identifications of at least some respective first data stored in the storage system and the respective second generation identifiers that correspond to the respective data, and wherein respective first hash values of the first hash values correspond to the at least some respective first data. In some examples, operation 1204 can be implemented in a similar manner as operation 1004 of FIG. 10, as applied to the checkpoint, and operation 1006 as applied to querying a search system.

In some examples, the search system stores access control lists of the storage system and extended attributes of the storage system.

After operation 1204, process flow 1200 moves to operation 1206.

Operation 1206 depicts determining respective second hash values for respective second data of the at least one first portion of the data. In some examples, operation 1206 can be implemented in a similar manner as operation 1004 of FIG. 10, as applied to determining hash values.

After operation 1206, process flow 1200 moves to operation 1208.

Operation 1208 depicts identifying at least one second portion of the data for which the respective second hash values do not match any of the first hash values. In some examples, operation 1206 can be implemented in a similar manner as operation 1004 of FIG. 10, as applied to identifying the at least one second portion of the data.

After operation 1208, process flow 1200 moves to operation 1210.

Operation 1210 depicts ingesting the at least one second portion of the data into the retrieval-augmented generation system while refraining from ingesting at least one third portion of the data that has at least one respective fourth generation identifier that is less than or equal to the respective second generation identifiers in the state file, and while refraining from ingesting at least one fourth portion of the data for which the respective second hash values match any of the first hash values. In some examples, operation 1206 can be implemented in a similar manner as operation 1004 of FIG. 10, as applied to ingesting data.

In some examples, the ingesting of the at least one second portion of the data comprises generating first chunks from the at least one second portion of the data, generating respective first vectors based on the respective first chunks, determining whether to ingest the respective first chunks based on whether the respective first vectors satisfy a similarity criterion with respect to respective second vectors that correspond to respective second chunks of the retrieval-augmented generation system. That is, for a newly-created chunk, a corresponding vector can be created, and a semantic search can be performed with the vector and vectors that correspond to chunks used by the RAG application, then similar vectors can be ranked.

In some examples, the similarity criterion is satisfied where a first vector of the first vectors is at least a threshold amount similar to a second vector of the second vectors.

This can be, for example, 95% similar.

In some examples, the ingesting of the at least one second portion of the data further comprises, based on ingesting a first chunk of the first chunks that corresponds to a first vector of the first vector that satisfies the similarity criterion with respecting to a second vector of the second vectors that corresponds to a second chunk of the second chunks, removing the second chunk from the retrieval-augmented generation system, and removing the second vector from the second vectors. That is, for each similar result, a correspond chunk and vector record can be located and deleted.

After operation 1210, process flow 1200 moves to 1212, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of computer system 102 and/or remote computer 106 of FIG. 1.

In some examples, computing environment 1300 can implement one or more embodiments of the process flows of FIGS. 5-12 to facilitate deduplication in RAG ingestion versioning.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.).

While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1316 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
   storing a checkpoint that comprises pairs and first hash values, wherein respective pairs of the pairs comprise respective identifications of at least some respective first data stored in a storage system and respective second generation identifiers that correspond to the respective data, and wherein respective first hash values of the first hash values correspond to the at least some respective first data;
   based on executing a retrieval-augmented generation process comprising performance of an iteration of ingesting data from the storage system and to send the data to be ingested by a retrieval-augmented generation system, wherein the retrieval-augmented generation process is configured to ingest the data via a communications protocol that omits tracking of previously-ingested data,
   querying a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data,
   determining respective second hash values for respective second data of the at least one first portion of the data,
   identifying at least one second portion of the data for which the respective second hash values do not match any of the first hash values, and
   ingesting the at least one second portion of the data into the retrieval-augmented generation system while refraining from ingesting at least one third portion of the data that has at least one respective fourth generation identifier that is less than or equal to the respective second generation identifiers in the checkpoint, and while refraining from ingesting at least one fourth portion of the data for which the respective second hash values match any of the first hash values; and
   servicing queries to the retrieval-augmented generation system based on the ingesting of the at least one second portion of the data.

2. The system of claim 1, wherein the ingesting of the at least one second portion of the data comprises:
   generating chunks from the at least one second portion of the data;
   determining respective third hash values for the respective chunks; and
   in response to a third hash value of the third hash values matching any of fourth hash values that correspond to previously-ingested chunks, refraining from ingesting a chunk of the respective chunks that corresponds to the third hash value.

3. The system of claim 2, wherein the generating of the chunks from the at least one second portion of the data comprises creating respective first embeddings for the respective chunks while refraining from creating second embeddings for the chunk.

4. The system of claim 2, wherein the chunk is a first chunk, wherein the at least one second portion of the data comprises a file, wherein the file comprises the first chunk and a second chunk, and wherein the operations further comprise:
   ingesting the second chunk of the file while performing the refraining from ingesting the first chunk of the file.

5. The system of claim 1, wherein the ingesting of the at least one second portion of the data comprises:
   generating chunks from the at least one second portion of the data; and
   refraining from ingesting a first chunk of the chunks that satisfies a similarity criterion with respect to a second chunk that has been ingested prior to the iteration of the ingesting of the data.

6. The system of claim 5, wherein the first chunk differs from the second chunk.

7. The system of claim 5, wherein the similarity criterion is based on a semantic analysis of the first chunk relative to the second chunk.

8. The system of claim 5, wherein the refraining from the ingesting of the first chunk is based on the second chunk having a higher ranking than the first chunk according to a quality of information criterion.

9. The system of claim 1, wherein the ingesting of the at least one second portion of the data comprises:
   generating chunks from the at least one second portion of the data; and
   removing a second chunk from a chunk store that is associated with the retrieval-augmented generation system based on a first chunk of the chunks satisfying a similarity criterion with respect to the second chunk.

10. A method, comprising:
    storing, by a system comprising at least one processor, a checkpoint that comprises pairs and first hash values, wherein respective pairs of the pairs comprise respective identifications of at least some respective first data stored in a storage system and respective second generation identifiers that correspond to the respective data, and wherein respective first hash values of the first hash values correspond to the at least some respective first data;

based on ingesting data from the storage system and to a retrieval-augmented generation system, querying, by the system, a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data;

determining, by the system, respective second hash values for respective second data of the at least one first portion of the data;

identifying, by the system, at least one second portion of the data for which the respective second hash values do not match any of the first hash values; and ingesting, by the system, the at least one second portion of the data into the retrieval-augmented generation system while refraining from ingesting at least one third portion of the data that has at least one respective fourth generation identifier that is less than or equal to the respective second generation identifiers in the checkpoint, and while refraining from ingesting at least one fourth portion of the data for which the respective second hash values match any of the first hash values.

11. The method of claim 10, wherein the ingesting of the data is a first iteration of the ingesting of the data, and further comprising:

based on performing a second iteration of the ingesting of the data, wherein the second iteration occurs prior to the first iteration, and based on determining, from the checkpoint, that respective third data of at least a third portion of the data has not previously been ingested, creating respective third hash values for the respective third data, and storing the respective third hash values in the checkpoint.

12. The method of claim 10, wherein the pairs are first pairs, wherein the ingesting of the data is a first iteration of the ingesting of the data, and further comprising:

based on performing a second iteration of the ingesting of the data, wherein the second iteration occurs prior to the first iteration, and based on determining, from the checkpoint, that respective third data of at least a third portion of the data has not previously been ingested, creating respective third hash values for respective chunks of the respective third data, and storing respective second pairs comprising the respective third hash values and the respective chunks.

13. The method of claim 12, wherein the respective second pairs are stored in a chunk store that is associated with the retrieval-augmented generation process.

14. The method of claim 12, wherein the respective second pairs are stored in the search system.

15. The method of claim 10, wherein the identifying of the at least one second portion of the data for which the respective second hash values do not match any of the first hash values occurs independently of respective first locations of the at least one second portion of the data, and occurs independently of respective second locations of the at least one first portion of the data that correspond to the respective first hash values.

16. A non-transitory computer-readable medium comprising instructions that, in response to execution, cause a system comprising at least one processor to perform operations, comprising:

based on ingesting data from a storage system and to a retrieval-augmented generation system, querying a search system to identify at least one first portion of the data that has at least one respective third generation identifier that is greater than respective second generation identifiers in a state file, wherein the search system stores respective metadata of respective first data from the storage system, wherein the respective metadata comprises respective first generation identifiers that indicate respective updates to the respective first data, wherein the state file comprises pairs and first hash values, wherein respective pairs of the pairs comprise identifications of at least some respective first data stored in the storage system and the respective second generation identifiers that correspond to the respective data, and wherein respective first hash values of the first hash values correspond to the at least some respective first data;

determining respective second hash values for respective second data of the at least one first portion of the data;

identifying at least one second portion of the data for which the respective second hash values do not match any of the first hash values; and ingesting the at least one second portion of the data into the retrieval-augmented generation system while refraining from ingesting at least one third portion of the data that has at least one respective fourth generation identifier that is less than or equal to the respective second generation identifiers in the state file, and while refraining from ingesting at least one fourth portion of the data for which the respective second hash values match any of the first hash values.

17. The non-transitory computer-readable medium of claim 16, wherein the ingesting of the at least one second portion of the data comprises:

generating first chunks from the at least one second portion of the data;

generating respective first vectors based on the respective first chunks; and determining whether to ingest the respective first chunks based on whether the respective first vectors satisfy a similarity criterion with respect to respective second vectors that correspond to respective second chunks of the retrieval-augmented generation system.

18. The non-transitory computer-readable medium of claim 17, wherein the similarity criterion is satisfied where a first vector of the first vectors is at least a threshold amount similar to a second vector of the second vectors.

19. The non-transitory computer-readable medium of claim 17, wherein the operations further comprise:

based on ingesting a first chunk of the first chunks that corresponds to a first vector of the first vector that satisfies the similarity criterion with respecting to a second vector of the second vectors that corresponds to a second chunk of the second chunks, removing the second chunk from the retrieval-augmented generation system, and removing the second vector from the second vectors.

20. The non-transitory computer-readable medium of claim 16, wherein the search system stores access control lists of the storage system and extended attributes of the storage system.

* * * * *